United States Patent
Ko

(10) Patent No.: US 8,140,696 B2
(45) Date of Patent: Mar. 20, 2012

(54) LAYERING SERIAL ATTACHED SMALL COMPUTER SYSTEM INTERFACE (SAS) OVER ETHERNET

(75) Inventor: Michael A. Ko, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 1010 days.

(21) Appl. No.: 11/684,802

(22) Filed: Mar. 12, 2007

(65) Prior Publication Data

US 2008/0228897 A1    Sep. 18, 2008

(51) Int. Cl.
    *G06F 15/16* (2006.01)
(52) U.S. Cl. ...................................... 709/230
(58) Field of Classification Search .................. 709/230
    See application file for complete search history.

(56) References Cited

U.S. PATENT DOCUMENTS

| | | | |
|---|---|---|---|
| 6,425,035 B2* | 7/2002 | Hoese et al. | 710/315 |
| 6,577,631 B1* | 6/2003 | Keenan et al. | 370/394 |
| 7,277,995 B2* | 10/2007 | Davies et al. | 711/154 |
| 2004/0139244 A1* | 7/2004 | Hufferd | 710/30 |
| 2005/0226239 A1 | 10/2005 | Nishida et al. | |
| 2006/0041691 A1 | 2/2006 | Bashford et al. | |
| 2006/0047908 A1 | 3/2006 | Chikusa et al. | |
| 2006/0080671 A1 | 4/2006 | Day et al. | |
| 2006/0095630 A1 | 5/2006 | Bashford et al. | |
| 2006/0098681 A1* | 5/2006 | Cafiero et al. | 370/445 |
| 2006/0101171 A1 | 5/2006 | Grieff et al. | |
| 2006/0187960 A1* | 8/2006 | Murakami et al. | 370/469 |
| 2006/0194386 A1 | 8/2006 | Yao et al. | |
| 2006/0195624 A1 | 8/2006 | Chikusa et al. | |
| 2006/0242283 A1* | 10/2006 | Shaik et al. | 709/223 |
| 2008/0104264 A1* | 5/2008 | Duerk et al. | 709/230 |

OTHER PUBLICATIONS

Elliot, Rob. "Serial Attached SCSI Link Layer—Part 1". Sep. 30, 2003.*
Liao, H., "Storage Area Network Architectures," Technology White Paper, Issue 1: Apr. 2003, PMC-2022178, pp. 1-35.
802.1Qau, "802.1Qau-Congestion Notification," http://www.ieee802.org/1/pages/802.1au.html, Sep. 15, 2006, pp. 1-4.
Wadekar, et al., "Proposal for Traffic Differentiation in Ethernet Networks," http://www.ieee.802.org/1/files/public/docs2005/new, Mar. 14, 2005, pp. 1-13.

* cited by examiner

Primary Examiner — Jeffrey Pwu
Assistant Examiner — Saad A Waqas
(74) Attorney, Agent, or Firm — Gibb I.P. Law Firm, LLC

(57) ABSTRACT

Disclosed are embodiments of a storage area network (SAN), a network interface card and a method of managing data transfers. These embodiments overcome the distance limitation of the Serial Attached Small Computer System Interface (SAS) physical layer so that SAS storage protocol may be used for communication between host systems and storage controllers. Host systems and storage controls are connected via an Ethernet interface (e.g., a legacy Ethernet or enhanced Ethernet for datacenter (EED) fabric). SAS storage protocol is layered over this Ethernet interface, providing commands and transport protocol for information exchange. Since the Ethernet interface has its own physical layer, the SAS physical layer is unnecessary and, thus, so is the SAS distance limitation. If legacy Ethernet is used, over-provisioning is used to avoid packet drops, or alternatively, TCP/IP is supported in order to recover from packet drops. If EED is used, congestion management as well as priority of service functions are provided by the EED protocols.

20 Claims, 6 Drawing Sheets

LAYERING SERIAL ATTACHED SMALL COMPUTER SYSTEM INTERFACE (SAS) OVER ETHERNET

BACKGROUND

1. Field of the Invention

The embodiments of the invention generally relate to Serial Attached SCSI (SAS) standards, and, more particularly, to expanding the distance limitation in the SAS physical layer so that SAS storage protocol may be implemented between host systems and storage controllers in a storage area network.

2. Description of the Related Art

Storage area networks (SAN) allow for the exchange of data packets between physically separated host computer systems and storage devices. Specifically, data packets are transported via one or more switches to one or more storage controllers which control storage of the data on one or more storage devices. These host computer systems can include, but are not limited to, personal computers or servers (e.g., application servers or database servers). Storage devices can include, but are not limited to, tape drives, disk drives, or disk systems (e.g., redundant arrays of independent disks (RAID) systems). SANs generally use Fiber Channel (FC) protocol for host computer system to storage controller communication because the host computer system and storage controller are usually physically separated and FC protocol has a physical layer distance limitation of approximately 50 miles or less. Small Computer System Interface (SCSI) protocol or Serial Attached SCSI (SAS) is generally used for storage controller to storage device communication because each storage controller is typically located in the same physical location (e.g., in the same box) as multiple storage devices and SCSI and SAS protocols have a physical layer distance limitation of approximately 6 meters.

More specifically, Serial Attached Small Computer System Interface (SAS) standards typically provide commands, transport protocols (i.e., defined rules) and interfaces for physically connecting and exchanging information between different SAS devices (e.g., computers and peripheral devices, storage controllers and storage devices located in the same box, etc.). Additionally, SAS standards define the rules for physically connecting and exchanging information between Serial Advanced Technology Attachment (SATA) hosts and SATA devices (e.g., between computers and storage devices, such as hard disks or CD-ROMs), using the same serial interconnect. There are five layers to the SAS standards. These layers include the physical layer, the link layer, the port layer, the transport layer, and the application layer. In network environments in which the rules for exchanging data are defined by SAS standards, the physical layer is targeted for device level interconnects and the SAS physical layer is limited to a distance coverage of approximately 6 meters. Thus, SAS standards are generally considered suitable for storage controller to storage device communication, but not host computer system to storage controller communication. However, except for this distance limitation, SAS protocols could be suitably implemented instead of FC protocols in storage area networks (SAN) to define the rules for exchanging information between the host computer systems and storage controllers, especially for the low end.

SUMMARY

In view of the foregoing, disclosed herein are embodiments of a storage area network (SAN), an associated network interface card and an associated method of managing data transfers. These embodiments overcome the distance limitation of the Serial Attached Small Computer System Interface (SAS) physical layer so that SAS storage protocol may be used for communication between host systems and storage controllers in the SAN. Host systems and storage controllers are connected via an Ethernet fabric (i.e., an Ethernet interface). SAS storage protocol is layered over this Ethernet interface, providing commands and transport protocol for exchanging information between the host systems and storage controllers. Since the Ethernet has its own physical layer, the need for a SAS physical layer is circumvented and, thus, so is the distance limitation. Congestion management and priority of service functions can be accomplished in a variety of manners. For example, a legacy Ethernet network can be over provisioned to ensure the that the network has sufficient capacity to support peak demands without suffering data packet drops Transmission control protocol and internet protocol (TCP/IP) can also be simultaneously implemented over a legacy Ethernet fabric to provide this congestion management functions. Alternatively, the Ethernet fabric can comprise an enhanced Ethernet for datacenter fabric that includes its own protocols for providing congestion management and priority of service functions, thereby, avoiding the need to use TCP/IP or to over-provision the network.

More particularly, the SAN embodiments can comprise at least one host computer system and at least one storage controller that are physically separated (e.g., by greater than approximately 6 meters). An Ethernet fabric (i.e., an Ethernet interface) can connect the host computer system(s) and storage controller(s).

Each host computer system in the SAN can comprise an operating system and a network interface card (NIC). Each NIC can comprise a bus interface for connecting to the host computer system and an Ethernet physical layer for connecting to the Ethernet fabric. Thus, the NIC connects its corresponding host computer system to the Ethernet fabric and, thereby, to the network storage controllers.

In each host system, either the operating system or an embedded processor (i.e., SAS offload engine) in the NIC can be adapted to implement SAS storage protocol on top of the Ethernet fabric. For example, per the SAS storage protocol, either the operating system or a SAS offload engine on the NIC can be adapted to encode SAS primitives, to assemble SAS headers defined for the SAS primitives and to assemble a SAS frame for each encoded SAS primitive that is used to delimit a SAS frame (i.e., to assemble a SAS frame if the presence of such a SAS frame is indicated by a trailing SAS primitive which delimits the SAS frame).

For example, per the SAS storage protocol, either the operating system or a SAS offload engine in the NIC can assemble SAS frames as follows. If a primitive comprises a start of frame (SOF), then a SAS frame can be assembled that comprises a sequenced packet protocol (SPP) frame. If a primitive comprises a start of address frame (SOAF), then a SAS frame can be assembled that comprises a SAS address frame. Additionally, if a primitive comprises a Serial Advanced Technology Attachment_start of frame (SATA_SOF), then a SAS frame can be assembled that comprises a Serial Advanced Technology Attachment (SATA) frame. The defined SAS headers can specify the primitive used and a SAS frame size. Specifically, if the primitive is used to delimit a SAS frame, then the SAS header that is defined will specify the primitive as well as the size of the SAS frame. However, if a primitive is used without a SAS frame, the SAS frame size defined by the SAS header will be represented by a zero (0).

Since the SAS storage protocol is implemented (i.e., layered) over an Ethernet fabric so that it uses the Ethernet physical layer, the SAN of the present invention does not require the SAS physical layer. Thus, the distance limitation of the SAS physical layer is overcome.

The NIC can further comprise an Ethernet media access control that is adapted to provide the basic functions of assembling, sending, and receiving Ethernet frames. This MAC can also be adapted to provide integrity check functions and, during sending/receiving of Ethernet frames, to provide congestion management without data drops and priority of service functions if enhanced Ethernet is supported (see detailed discussion below regarding enhanced Ethernet). Specifically, this MAC can be adapted to assemble Ethernet frames, where each frame comprises an Ethernet header and a cyclic redundancy check (CRC) for data protection. Additionally, since SAS storage protocol is layered over the Ethernet fabric, the MAC can further be adapted to assemble the Ethernet frames such that each of the Ethernet frames also comprises the SAS header and, if applicable, the SAS frame that are output from the host operating system (or optional SAS offload engine). That is, the Ethernet frames assembled by the MAC can encapsulate either a SAS header without the SAS frame (e.g., if an encoded SAS primitive is not used to delimit a SAS frame) or a SAS header followed by a SAS frame (e.g., if the presence of such a SAS frame is indicated by a pair of SAS primitives which delimits the SAS frame).

Since the Ethernet frames are assembled such that they include a cyclic redundancy check for providing data protection, a SAS frame that is encapsulated in an Ethernet frame can rely on the data protection afforded by this same cyclic redundancy check.

The SAN embodiments can also provide congestion management and optionally priority of service functions, when Ethernet frames are sent and received. For example, the Ethernet fabric can be over-provisioned to ensure that it has sufficient capacity to support peak demands without suffering data packet drops. Alternatively, the operating system of each host system or a second embedded processor (i.e., a TCP/IP offload engine) on the NIC can be adapted to implement transmission control protocol and internet protocol (TCP/IP) over the Ethernet fabric to provide the congestion management function. However, those skilled in the art will recognize that both over-provisioning and implementing TCP/IP are costly.

Therefore, rather than using a legacy Ethernet which would require over-provisioning or TCP/IP to avoid data packet drops and/or to recover from data packet drops, the Ethernet fabric can comprise an enhanced Ethernet for datacenter (EED) fabric (i.e., an EED fabric). This EED fabric is improved over legacy Ethernet because it can provide (e.g., via an enhanced MAC) both a congestion management function without data packet drops and a priority of service function, when sending and receiving Ethernet frames. Thus, SAS storage protocol can be layered over an Ethernet fabric and, particularly, an EED interface without requiring the use of TCP/IP.

Also disclosed herein are embodiments of the network interface card (NIC), described above, and embodiments of an associated method of managing communication between host computer systems and storage controllers in a storage area network (SAN), as described above.

The method embodiments comprise connecting one or more host computer systems to one or more storage controllers in a SAN by using an Ethernet fabric (i.e., an Ethernet interface, such as a legacy Ethernet or enhanced Ethernet for datacenter (EED)). Then, a Serial Attached Small Computer System Interface (SAS) storage protocol can be layered over the Ethernet fabric. That is, a SAS storage protocol is implemented over the Ethernet fabric between the host systems and the storage controllers in order to provide commands and transport protocol for exchanging information. Due to this implementing process and specifically to the fact that SAS storage protocol is implemented over an Ethernet fabric which has its own physical layer, the SAS physical layer is no longer necessary. Thus, the 6 meter distance limitation is overcome and the process of connecting host system(s) and storage controller(s) can comprise connecting them such that the distance between them is greater than approximately 6 meters.

The process of implementing the SAS storage protocol can comprise encoding SAS primitives, assembling SAS headers defined for each of the primitives that are encoded and assembling a SAS frame which is delimited by a pair of SAS primitives marking the beginning and the end of the SAS frame. Specifically, assembling the SAS headers can comprise specifying in each SAS header the SAS primitive that is encoded as well as the SAS frame size. For example, if a pair of SAS primitives is used to delimit a SAS frame, then assembling the SAS header can comprise specifying in the SAS header the primitive used as well as the size of the SAS frame. However, if a primitive is used without a SAS frame, then assembling the SAS header can comprise specifying in the SAS header the primitive used and further representing the size of the SAS frame as zero (0).

The process of assembling the SAS frames can comprise defining and assembling the type of SAS frame based on the type of primitive used. For example, per the SAS storage protocol, a SAS frame can be assembled as a sequenced packet protocol (SPP) frame, if the primitive comprises a start of frame (SOF). A SAS frame can be assembled as a SAS address frame, if the primitive comprises a start of address frame (SOAF). A SAS frame can be assembled as a Serial Advanced Technology Attachment (SATA) frame, if the primitive comprises a Serial Advanced Technology Attachment_start of frame (SATA_SOF).

Once a SAS header and, if applicable, a SAS frame are assembled, an Ethernet frame can be assembled. The process of assembling Ethernet frames can comprise assembling Ethernet frames such that each frame comprises an Ethernet header. Since SAS storage protocol is layered over the Ethernet fabric, the Ethernet frames are further assembled such that each frame also comprises a previously assembled SAS header and, if applicable, a previously assembled SAS frame. Specifically, each Ethernet frame is assembled such that it encapsulates either a SAS header without a SAS frame (e.g., if a pair of SAS primitives is not used to delimit a SAS frame) or a SAS header followed by a SAS frame (e.g., if a pair of SAS primitives is used to delimit the SAS frame). The process of assembling Ethernet frames can further comprise assembling the Ethernet frames such that each also comprises a cyclic redundancy check for providing data protection. Thus, any SAS frames contained in the Ethernet frames can rely on the data protection afforded by this cyclic redundancy check.

Once Ethernet frames are assembled, they can be sent over the Ethernet fabric, for example, to a specified storage controller.

The method can further comprise providing congestion management functions, when Ethernet frames are sent over the Ethernet fabric. If legacy Ethernet is used to connect the host systems and storage controllers, then these functions can be provided either by over-provisioning the Ethernet fabric or by implementing transmission control protocol and internet protocol (TCP/IP) over the Ethernet fabric (e.g., by the operating system of the host system or by a TCP/IP offload engine on the host system's network interface card (NIC)). Alternatively, if an EED is used to connect the host systems and storage controllers, then congestion management as well as priority of service functions can be provided by the EED protocols themselves.

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which.

DETAILED DESCRIPTION OF PREFERRED EMBODIMENTS

Figure 1:
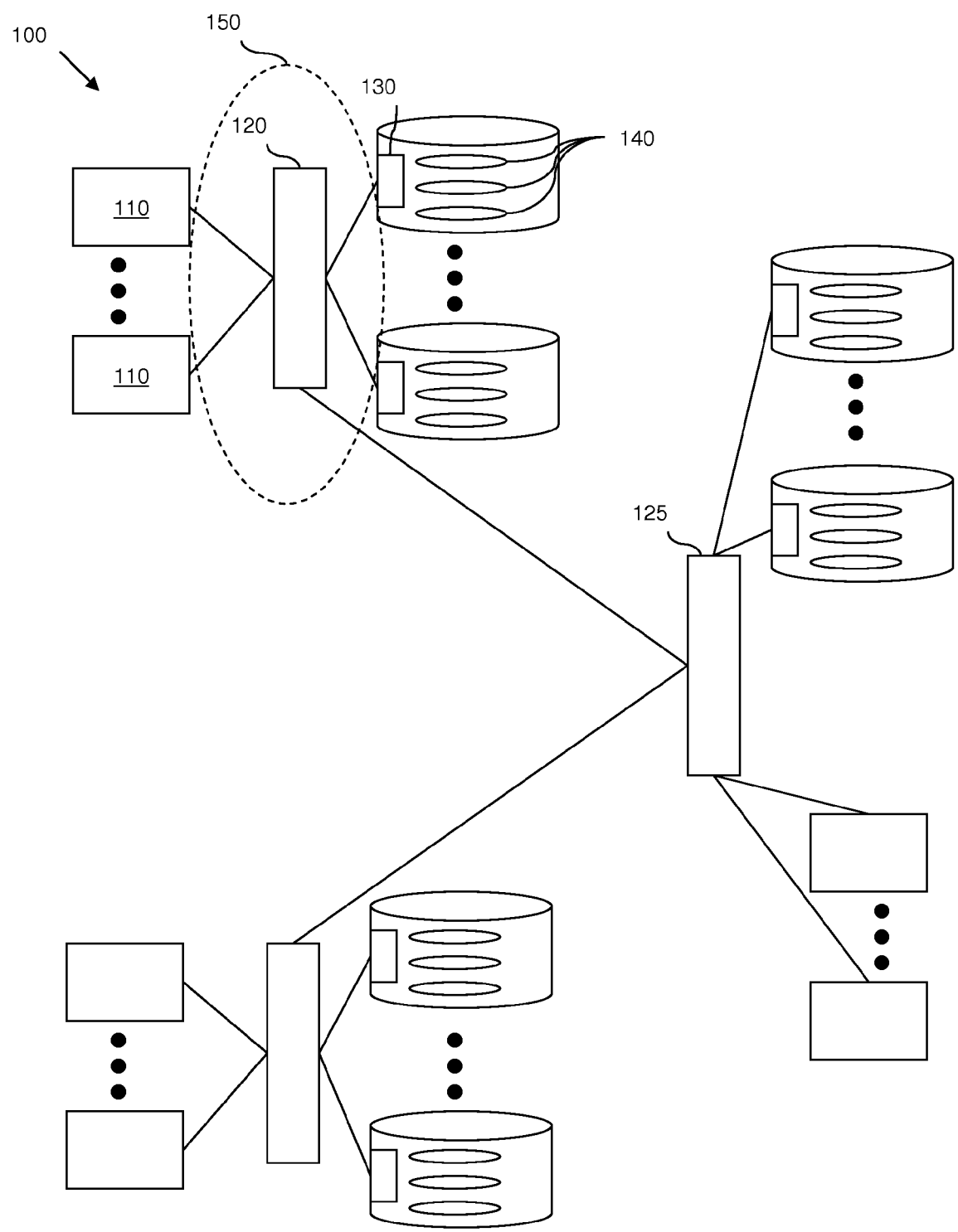
FIG. 1 is a schematic representation of an embodiment of a storage area network.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

As mentioned above, storage area networks (SAN) allow for the exchange of data packets between physically separated host computer systems and storage devices. Specifically, data packets are transported via one or more switches to one or more storage controllers which control data storage on one or more storage devices. These host computer systems can include, but are not limited to, personal computers or servers (e.g., application servers or database servers). Storage devices can include, but are not limited to, tape drives, disk drives, or disk systems (e.g., redundant arrays of independent disks (RAID) systems). SANs generally use Fiber Channel (FC) protocol for host computer system to storage controller communication because the host computer system and storage controller are usually physically separated and FC protocol has a physical layer distance limitation of up to approximately 50 miles or less. Small Computer System Interface (SCSI) protocol or Serial Attached SCSI (SAS) is generally used for storage controller to storage device communication because each storage controller is typically located in the same physical location (e.g., in the same box) as multiple storage devices and SCSI and SAS protocols have a physical layer distance limitation of approximately 6 meters.

More specifically, Serial Attached Small Computer System Interface (SAS) standards typically provide commands, transport protocols (i.e., defined rules) and interfaces for physically connecting and exchanging information between different SAS devices (e.g., computers and peripheral devices, storage controllers and storage devices located in the same box, etc.). Additionally, SAS standards define the rules for physically connecting and exchanging information between Serial Advanced Technology Attachment (SATA) hosts and SATA devices (e.g., between storage devices, such as hard disks or CD-ROMs), using the serial interconnect. There are five layers to the SAS standards. These layers include the physical layer, the link layer, the port layer, the transport layer, and the application layer. In network environments in which the rules for exchanging data are defined by SAS standards, the physical layer is targeted for device level interconnects and the SAS physical layer is limited to a distance coverage of approximately 6 meters. Thus, SAS standards are generally considered suitable for storage controller to storage device communication, but not host computer system to storage controller communication due to the 6 meter distance limitation.

One solution for overcoming the distance limitation imposed by the SAS physical layer so that SAS standards may be employed in a SAN environment between the host computer systems and storage controllers is to develop a new SAS physical layer architecture and/or to use optical components. However, this solution would increase costs.

In view of the foregoing disclosed herein are embodiments of storage area network (SAN), a network interface card and a method of managing data transfers. These embodiments overcome the distance limitation of the Serial Attached Small Computer System Interface (SAS) physical layer so that SAS storage protocol may be used for communication between host systems and storage controllers in the SAN. Host systems and storage controls are connected via an Ethernet fabric (i.e., an Ethernet interface, such as a legacy Ethernet fabric or an enhanced Ethernet for datacenter (EED) fabric). SAS storage protocol is layered over this Ethernet fabric, providing commands and transport protocol for exchanging information between the host systems and storage controllers. Since the Ethernet fabric has its own physical layer, the need for a SAS physical layer is circumvented and, thus, so is the SAS distance limitation.

More particularly, referring to FIG. 1, disclosed herein are embodiments of a storage area network (SAN) system 100. The SAN 100 can comprise at least one host computer system 110 and at least one storage controller 130. The storage controllers 130 can be adapted to control storage of and access to data on one or more corresponding storage devices 140. The host computer systems 110 can include, but are not limited to, personal computers or servers (e.g., application servers or database servers). The storage devices 140 can include, but are not limited to, tape drives, disk drives, or disk systems (e.g., redundant arrays of independent disks (RAID) systems).

The SAN 100 can also comprise an Ethernet fabric 150 (i.e., an Ethernet interface) that connects host computer system(s) 110 and storage controller(s) 130. This Ethernet fabric 150 can comprise switches and hubs, generally without Ethernet routers or gateways. This limits deployment of the SAN 100 to be in the same subnet with minimal impact because the Ethernet fabric 150 is intended for the datacenter only. Thus, in the SAN 100, data packets contained in Ethernet frames can be transported over the Ethernet fabric 150 via one or more switches 120, 125 to one or more storage controllers 130. Instead of SAS edge expanders and SAS fanout expanders, Ethernet switches such as switches 120 and 125 can provide communication between the devices connected to the Ethernet switch 120, 125 without the architectural limitations as in SAS (e.g., the one hundred and twenty-eight devices limitation).

Besides using the Ethernet fabric 150 for communication with other host computer systems and remote LAN devices, each host computer system 110 in the SAN 100 can be Serial Attached Small Computer System Interface (SAS) storage protocol enabled (i.e., can be adapted to implement SAS storage protocol over this Ethernet interface 150) in order to provide commands and transport protocol for exchanging information between physically separated host computer system(s) 110 and storage controller(s) 130.

Figure 2:
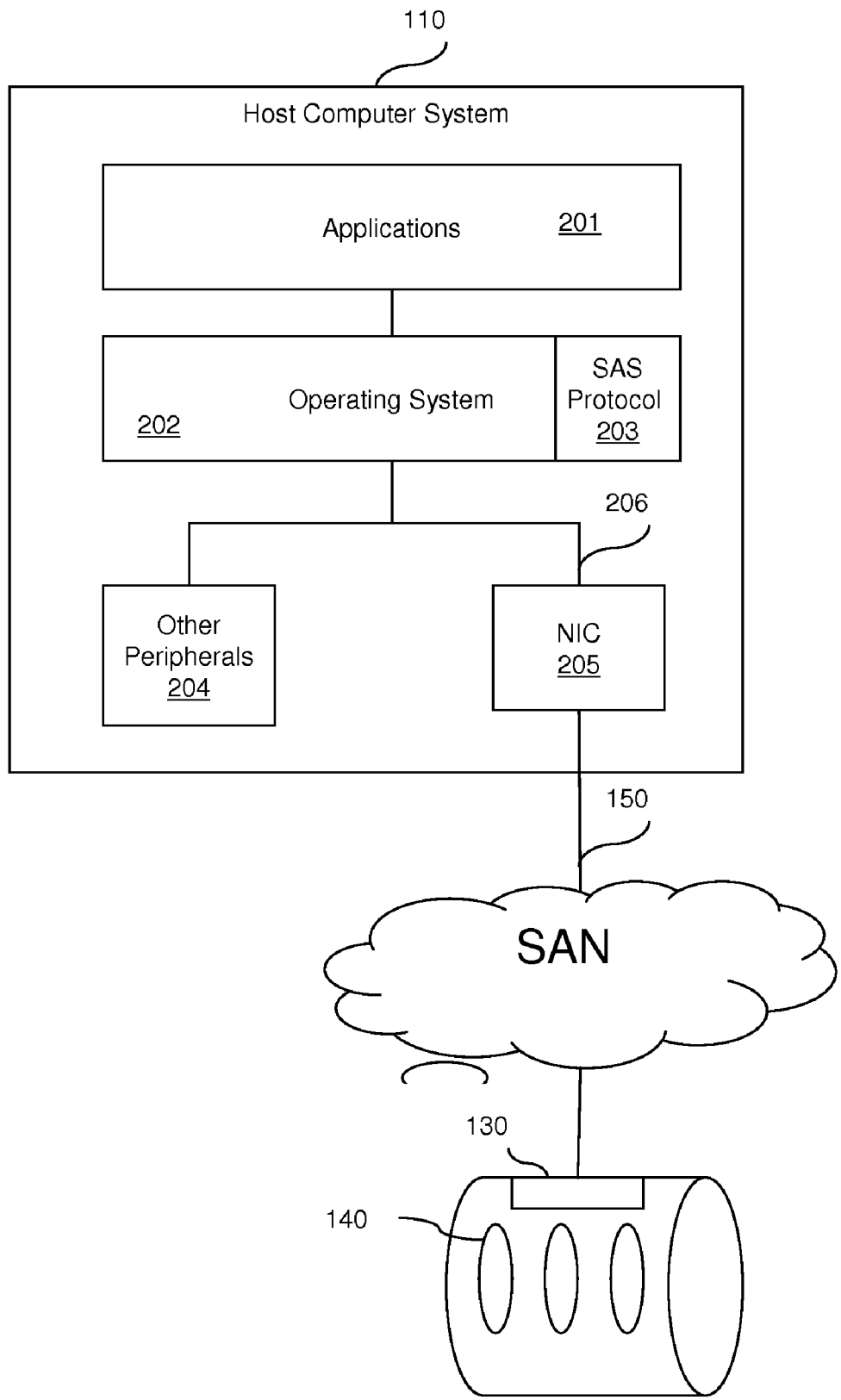
FIG. 2 is a schematic representation of an embodiment of a host computer system that can be incorporated into the storage area network of FIG. 1.
Figure 3:
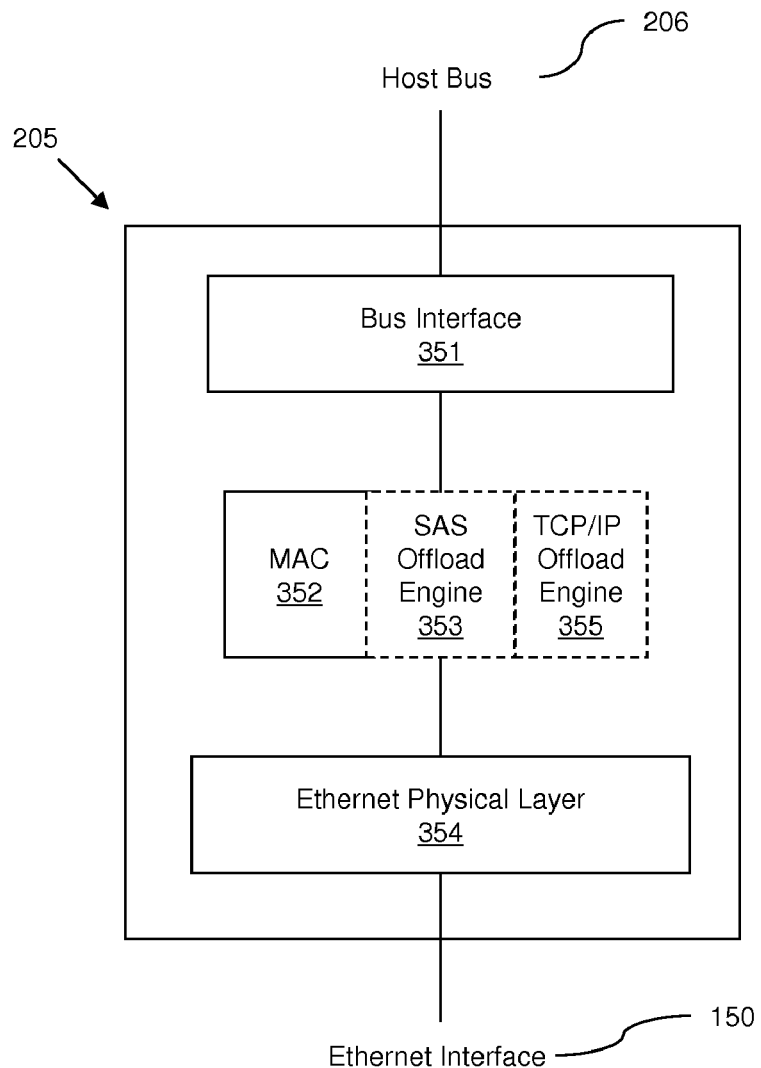
FIG. 3 is a schematic representation of an embodiment of a network interface card that can be incorporated into the host computer system of FIG. 2.

Referring to FIGS. 2-3 in combination with FIG. 1, each host computer system 110 in the SAN 100 can comprise application(s) 201 that require access to and storage of data, an operating system 202 and an Ethernet network interface card (NIC) 205.

Each NIC 205 can comprise a bus interface 351 for connecting to the host computer system 110 (e.g., to a peripheral bus 206 of the host computer system 110) and an Ethernet physical layer 354 (e.g., a copper PHY device or a SERDES and optical receiver) for connecting to the Ethernet interface 150. Thus, the NIC 205 can connect its corresponding host computer system 110 to the Ethernet interface 150 and, thereby, to the network storage controllers 130 for storing and accessing data on the storage devices 140.

Host systems 110 are SAS storage protocol enabled, for example, by either software in their operating systems 202 or an embedded processor 353 (i.e., a SAS offload engine) in their Ethernet NIC 405. That is, either the operating system 202 itself or an embedded processor 353 in the NIC 205 can be adapted to implement the SAS storage protocol on top of the Ethernet interface 150. Since each host system 110 is SAS storage protocol enabled and since Ethernet interface 150 has its own physical layer 354, a SAS physical layer is unnecessary. Thus, the distance limitation of the SAS physical layer is overcome and host computer systems 110 can be connected to storage controllers 130 where a distance between them is up to or greater than 6 meters.

Those skilled in the art will recognize that with conventional SAS storage protocol, the SAS link layer uses a construct known as primitives. Primitives are special 8b/10b encoded characters that are used as frame delimiters, for out of band signaling, control sequencing, etc. These SAS primitives are defined to work in conjunction with the SAS physical layer. However, since, as discussed above, the SAS physical layer is unnecessary, an alternate means of conveying the SAS primitives is needed. In one embodiment, this can be accomplished by defining a SAS header to be encapsulated in an Ethernet frame.

Specifically, referring again to FIGS. 2 and 3 in combination with FIG. 1, either the operating system 202 or a SAS offload engine 353 in a NIC 205 can be adapted to encode primitives, to assemble SAS headers defined for those primitives, and to assemble a SAS frame which is delimited by a pair of SAS primitives marking the beginning and the end of the SAS frame. The process of encoding a SAS primitive involves defining a code point for one or more SAS primitives that are used together to denote a particular function in the SAS protocol. The code point is then embedded in the SAS header to represent the SAS primitive.

For example, per the SAS storage protocol, either the operating system 202 or a SAS offload engine 353 in the NIC 205 can assemble SAS frames as follows. If a primitive comprises a start of frame (SOF), then a SAS frame can be assembled that comprises a sequenced packet protocol (SPP) frame. If a primitive comprises a start of address frame (SOAF), then a SAS frame can be assembled that comprises a SAS address frame. Additionally, if a primitive comprises a Serial Advanced Technology Attachment_start of frame (SATA_SOF), then a SAS frame can be assembled that comprises a Serial Advanced Technology Attachment (SATA) frame. The defined SAS headers can specify the primitive used and a SAS frame size. Specifically, if a pair of primitives is used to delimit a SAS frame, then the SAS header that is defined will contain a codepoint that specifies the type of SAS frame delimited by the primitives as well as the size of the SAS frame. However, if a primitive is used without a SAS frame, the size defined by the SAS header will be represented by a zero (0).

Figure 4:
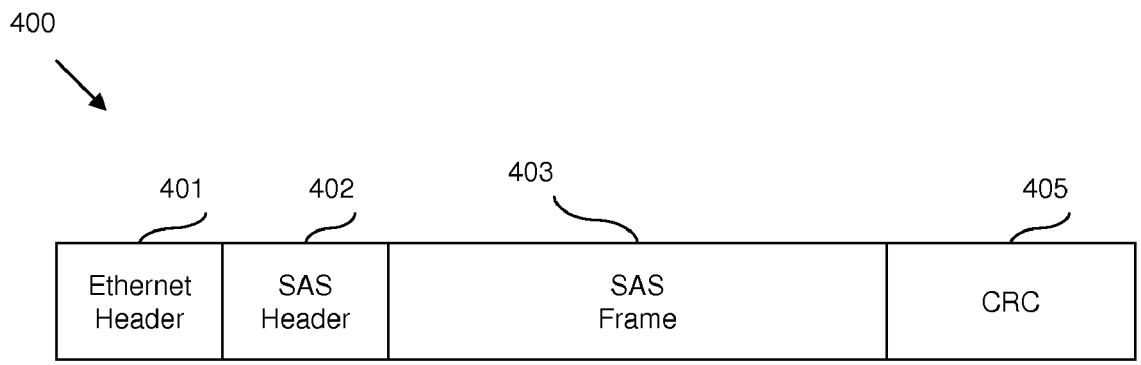
FIG. 4 is a schematic representation of an exemplary Ethernet frame.

Additionally, the NIC 205 can comprise an Ethernet media access control (MAC) 352 that is adapted to provide the basic functions of assembling, sending, and receiving Ethernet frames 400 (see FIG. 4). More specifically, the MAC 352 can be adapted to assemble Ethernet frames 400, where each frame comprises an Ethernet header 401 and a cyclic redundancy check (CRC) 405 for data protection. Since SAS storage protocol is layered over the Ethernet interface 150, this MAC 352 can be in communication with either the operating system 202 or the optional SAS offload engine 353 on the NIC 205 and can further be adapted to assemble the Ethernet frames 400 such that each of the Ethernet frames 400 also comprises the SAS header 402 and, if applicable, the SAS frame 403 that are output from the host operating system 202 (or the optional SAS offload engine 353). Specifically, Ethernet frames 400 assembled by the MAC 352 can encapsulate either a SAS header 402 without a SAS frame 403 (e.g., if a pair of SAS primitives is not used to delimit a SAS frame) or a SAS header 402 followed by a SAS frame 403 (e.g., if a pair of SAS primitives is used to delimit the SAS frame).

Additionally, since the Ethernet frames 400 are assembled such that they include a cyclic redundancy check 405 for providing data protection, a SAS frame 403 that is encapsulated in an Ethernet frame 400 can rely on the data protection afforded by this same cyclic redundancy check 405. It should be understood that this Ethernet frame 400 of FIG. 4 represents only one possible embodiment of the framing protocol, which can be used in conjunction with the disclosed SAN 100.

Other features of the SAN 100 of the present invention are also noteworthy. For example, not all SAS primitives are needed when SAS storage protocol is layered over Ethernet 150 in the SAN 100. Specifically, the following SAS primitives are unnecessary:

(1) Primitives that are strictly for the SAS physical layer, such as ALIGN, NOTIFY, HARD_RESET, SATA_CONT, and SATA_SYNC, are not needed since the underlying physical layer is Ethernet physical layer and the SAS physical layer is eliminated.

(2) Primitives that are associated with SAS expanders, such as AIP, ERROR, and SATA_ERROR, are not needed since switches and not expanders provide the necessary connections.

(3) Except for BROADCAST (SES), all other BROADCAST primitives are not needed since they are used by the expanders only and, again, switches and not expanders are used. In the SAN embodiments of the present invention, when a SAS target (i.e., a targeted storage device controlled by a given storage controller) needs to invoke BROADCAST (SES), it sends a SAS frame with the SAS Link Layer Primitive field indicating BROADCAST (SES). In addition, the Ethernet broadcast function is used in sending this SAS frame.

(4) Primitives that mark the end of a frame, such as EOAF, EOF, and SATA_EOF, are not needed since the delimitation of an Ethernet frame is already defined in the Ethernet layer.

(5) Primitives for SATA power management, such as SATA_PMACK, SATA_PMNAK, SATA_PMREQ_P, and SATA_PMREQ_S, are not needed since the power management function is to be handled by the storage controller 330.

(6) Primitives for SATA flow control, such as SATA_HOLD and SATA_HOLDA are not needed since the SATA data is encapsulated in Ethernet frames. That is, in the present SAN 300, when transmitting data, an Ethernet frame is not sent until the sender has forwarded a complete SAS frame to the Ethernet layer and therefore SATA_HOLD is not needed. Additionally, when receiving data, the receiver must ensure that sufficient buffering is available for the anticipated transfer and SATA_HOLD is not allowed.

(7) The primitive for SATA handshake, SATA_R_IP, is also not needed since it does not convey any useful information given that EED 350 is a reliable transport medium. Furthermore, Ethernet is a shared medium and SATA_R_IP will create unnecessary traffic.

Additionally, the SAS storage protocols, discussed above, are intended to be implemented between the host computer systems 110 and storage controllers 130 within the SAN 100. Either the same SAS storage protocol or a different storage protocol (e.g. Serial Advanced Technology Attachment (SATA) storage protocol) can be implemented within the SAN 100 between the network storage controllers 130 and their corresponding storage devices 3140. Also, although the SAN 100 would support Serial Advanced Technology Attachment (SATA) between host systems and storage controllers, the storage controller 130 would not be precluded from appearing as if only SAS storage protocol enabled devices are attached or from acting as a gateway between the Ethernet and both SAS storage protocol enabled devices and native SATA devices attached to a storage controller.

In the embodiment described above, SAS storage protocol is layered directly over Ethernet as defined by current IEEE 802.3 standards (i.e., referred to herein as legacy Ethernet) without the TCP/IP layer. Those skilled in the art would recognize that TCP/IP support would add to the central processing unit (CPU) overhead, throughput latency, and overall system costs, and may negate some of the benefits of using Ethernet as the physical and link layer for the SAS storage protocol. The TCP layer is not needed for the following reasons. First, SAS provides a credit based flow control in the form of the receiver ready (RRDY) primitive. This renders the TCP windowing scheme redundant. Second, in SAS, each SAS frame results in an acknowledgement (ACK) primitive indicating a received packet or a negative acknowledgement (NAK) primitive indicating an error (e.g., non-receipt of a packet). This renders the TCP acknowledgement scheme redundant. Third, a SAS frame is protected by a cyclic redundancy check (CRC), which is a stronger form of data integrity protection than the TCP checksum. Fourth, SAS is a message-based protocol, while TCP is a byte-stream protocol. A SAS frame is limited to 1052 bytes, which fits nicely inside an Ethernet frame and essentially obviates the need for the TCP segmentation function. The IP layer is not needed since the SAS domain is limited to a maximum of 16K end devices which can be contained within a single subnet. The IP layer is necessary if there are routers connecting multiple subnets in a SAN. So for a single subnet, the use of routers is not needed and hence the IP layer is not necessary.

Additionally, in the IEEE 802.3 standard, the EtherType field in the Ethernet frame provides a context for the interpretation of the data field of the frame and is used for protocol identification. Since in the present embodiments SAS storage protocol is layered over the Ethernet interface 150, a new IEEE 802.3 standard with a new Ethertype will be provided by the IEEE Ethertype field register.

However, the layering of the SAS storage protocol directly over legacy Ethernet without the TCP/IP layer does not address congestion management concerns. If SAN 100 experiences congestion, packets can be dropped and this can create problems. Without the TCP layer handling the retransmission, the SAS layer will be responsible for error recovery. One alternative is to ensure that SAN 100 is over-provisioned in terms of bandwidth. In other words, there are more than enough links and network connections in SAN 100 so that traffic congestion is unlikely. However, those skilled in the art will recognize that over-provisioning can also be costly.

Therefore, in another embodiment of the SAN 100, the Ethernet fabric 150 (i.e., the Ethernet interface) can comprise an enhanced Ethernet. This enhanced Ethernet is improved over legacy Ethernet (i.e., over the Ethernet as defined by current IEEE 802.3 standards) because it can provide (e.g., via an enhanced MAC) both a congestion management function without data packet drops and a priority of service function, when sending and receiving Ethernet frames. Thus, SAS storage protocol can be layered directly over the enhanced Ethernet fabric without the TCP/IP layer, without having to support an error recovery mechanism to handle dropped packets.

Specifically, this enhanced Ethernet for datacenter (EED) fabric 150 (i.e., the enhanced Ethernet fabric) performs the same functions as legacy Ethernet. Particularly, the enhanced MAC 352 that is used on host systems 110 that are EED enabled is adapted to perform the basic functions of assembling, sending, receiving and checking the integrity of Ethernet frames 400. However, additionally, this enhanced MAC 352 can further be adapted to perform both congestion management and priority of service functions, when sending and receiving Ethernet frames 400. Since, as with the legacy Ethernet, an EED 150 has its own physical layer, the need for a SAS physical layer is circumvented and, thus, so is the distance limitation. Additionally, since EED enabled devices provide for congestion management and priority of service functions, the use of TCP/IP can be avoided. In this embodiment, since the SAN 100 does not use an internet protocol (IP) layer, addressing is based on the enhanced Ethernet MAC 552 address.

More specifically, currently there are efforts underway by the Ethernet standardization body, viz., the IEEE 802 LAN/MAN Standards Committee, to enhance the Ethernet interface to address the issue of congestion management and service priority. To bound the problem, the new standards are confined to datacenter environments only. Although not yet adopted into the IEEE 802 standards, these proposals provide an enhanced Ethernet interface for datacenter environments (EED). For example, the IEEE 802.1Qau workgroup on Congestion Notification (see http://www.ieee802.org/1/pages/802.1au.html) specifies protocols, procedures and managed objects, which are incorporated herein by reference and which support congestion management of long-lived data flows within network domains of limited bandwidth delay product.

Figure 5:
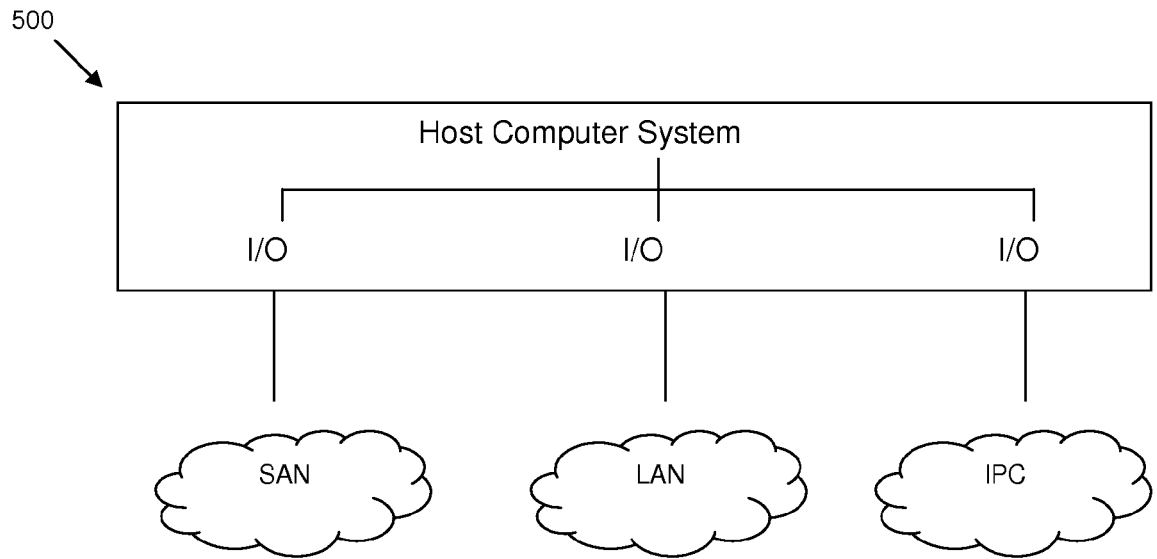
FIG. 5 is a schematic representation of different fabrics used in a datacenter.
Figure 6:
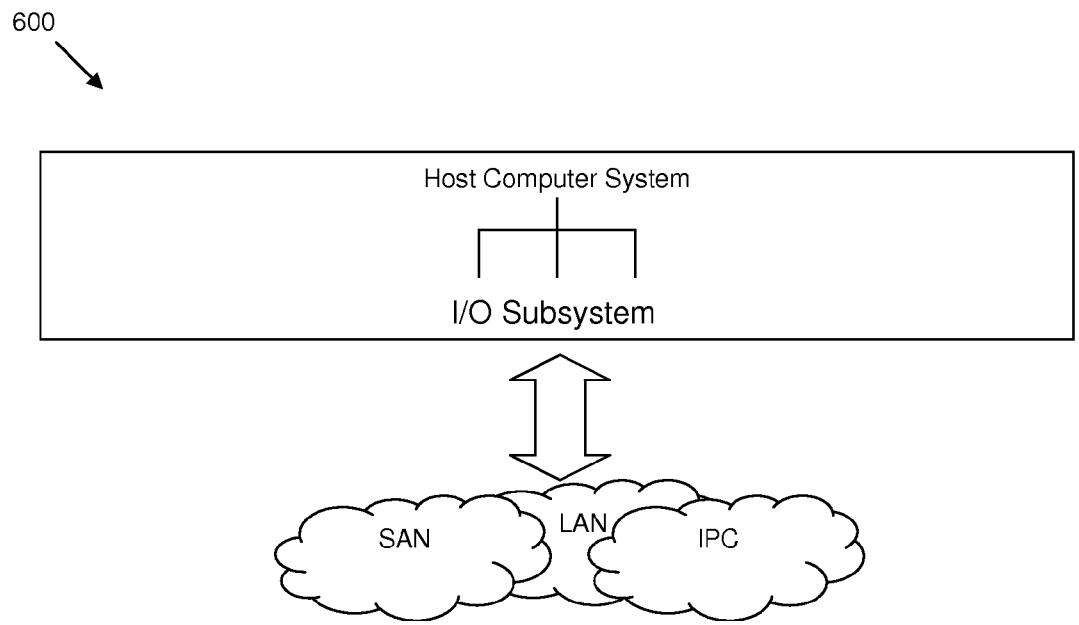
FIG. 6 is a schematic representation of datacenter fabric using enhanced Ethernet.

That is, referring to FIG. 5, in a legacy Ethernet system 500, different types of traffic (e.g., local area network (LAN) traffic, storage area network (SAN) traffic, inter-processor communications (IPC), etc.) require different input/output network technologies such as Ethernet, Fiber Channel, InfiniBand, etc. However, referring to FIG. 6, the EED 600 is adapted to consolidate the input/outputs of LAN, SAN and IPC traffic. Thus, different traffic types share the same queues, the same resources, etc., of the enhanced Ethernet 600. By taking on the role of the consolidated fabric, the enhanced Ethernet (EED) 600 will manage congestion without packet drops, with lower latency, and with better provisions for traffic prioritization all at the link layer.

For example, as proposed EED 600 will use backward congestion notification to control the ingress rate at the source. It will provide link level flow control as insurance against packet drops in the form of enhanced IEEE 802.3× PAUSE to provide per-priority flow control for increased granularity Additionally, with EED virtual links (VL) providing traffic differentiation, one type of VL can be set up to provide "no-drop" behavior for mission critical applications. Another type of VL can be set up for legacy Ethernet traffic where packets can be dropped if necessary. These protocol enhancements are currently being considered for standardization in the IEEE 802.1 and 802.3 working groups.

Since SAS and SATA drives are projected to dominate the disk drive interfaces in the future, layering SAS storage protocols over Ethernet 150 (e.g., over legacy Ethernet or EED) allows the host 110 and the storage controller 130 to support SAS and SATA devices directly without relying on another layer of protocol translation, such as Fiber Channel. This simplifies the design and results in lower cost for the host 110 and/or the storage controller 130. Furthermore, layering SAS storage protocol over Enthernet 150 removes the requirement for a separate fabric for storage. Instead, Ethernet 150 can be used not only for storage, but other communication needs as well (e.g., local area network (LAN) traffic).

Referring to again to FIGS. 2-4 in combination, also disclosed herein are embodiments of the network interface card (NIC) 205, described above, that can be incorporated into a host computer system 110 in a storage area network (SAN) 100 for providing the interface between that host computer system 110 and the external network 150 (i.e., the legacy Ethernet or enhanced Ethernet for datacenter (EED) fabric) and for providing commands and transport protocol for exchanging information between the physically separated (e.g., by greater than approximately 6 meters) host computer system 110 and one or more storage controllers 130. Specifically, a NIC card 205 can reside in a host computer system 110 and can comprise a host bus interface 351 for connecting to an internal bus 206 (e.g., a peripheral bus) of the host computer system 110. Thus, the NIC card 205 can be connected to (i.e., in communication with) other components of the host computer system (e.g., the operating system 202, applications 201, etc.). Additionally, the NIC card 205 can comprise the Ethernet physical layer 354 that provides the connection to the Ethernet fabric 150. For example, the Ethernet physical layer can comprise a copper PHY for connection to a copper Ethernet interface or SERDES and optical transceiver for connection to an optical Ethernet interface.

As discussed in detail above, this NIC card 205 can also comprise an embedded processor 353 (i.e., SAS offload engine) that is adapted to implement the SAS storage protocol on top of the Ethernet interface 150 and an Ethernet media access control (MAC) 352 for providing the basic functions of assembling, sending, receiving and checking the integrity of Ethernet frames 400. As discussed in detail above, if the Ethernet interface is an EED the MAC 352 can be enhanced to provide congestion management and priority of service functions, when sending/receiving Ethernet frames.

Figure 7:
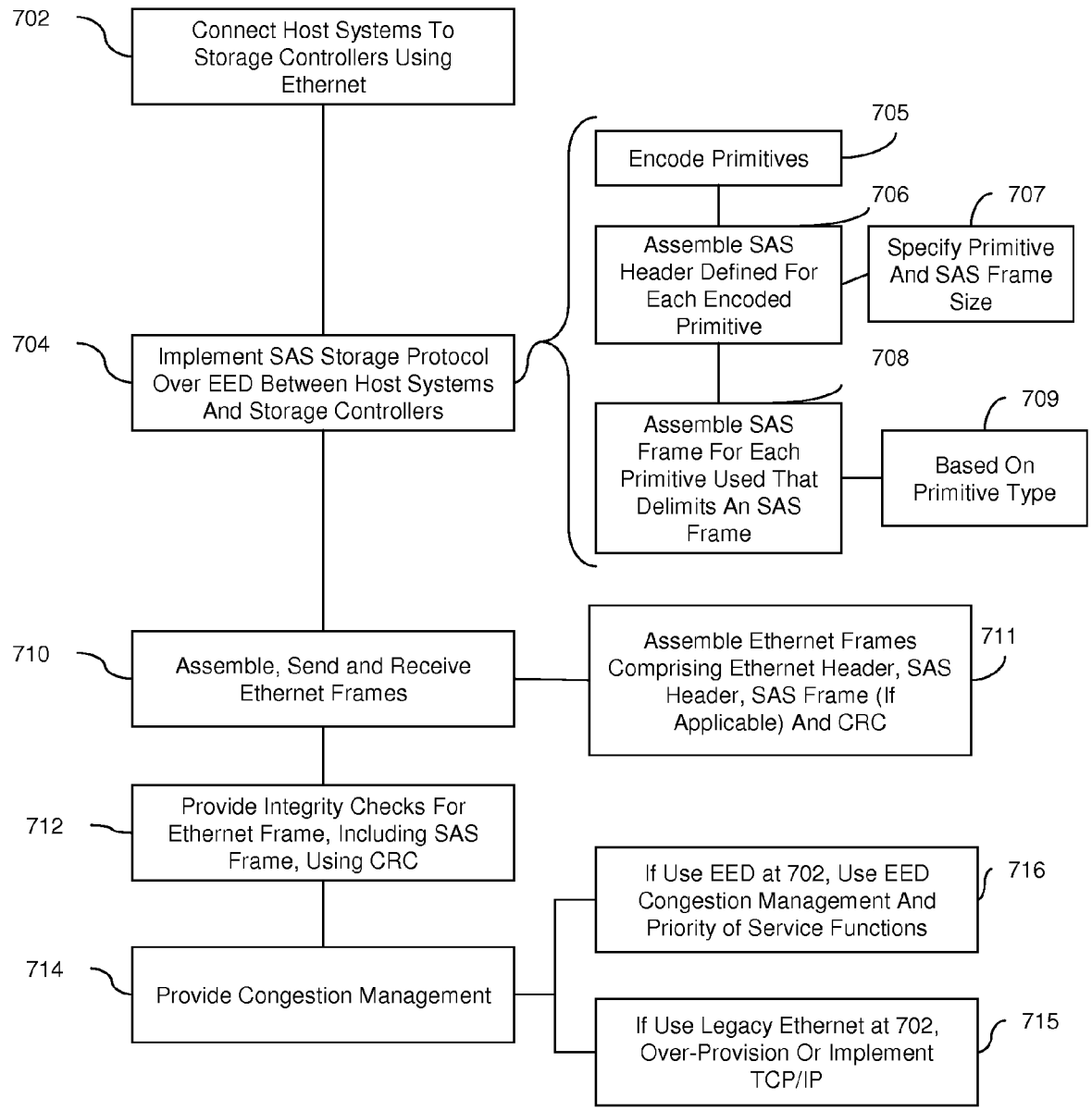
FIG. 7 is a flow diagram illustrating an embodiment of a method of managing data transfers.

Referring to FIG. 7, also disclosed herein are embodiments of an associated method of managing communication between host computer systems and storage controllers in a storage area network (SAN), such as the SAN described above.

The method embodiments comprise connecting one or more host computer systems 110 to one or more storage controllers 130 in the SAN 100 by using an Ethernet fabric 150 (e.g., a legacy Ethernet, as defined by current IEEE 802.3 standards, or an enhanced Ethernet for datacenter (EED), as defined by the IEEE 802.1Qau workgroup on Congestion Notification, (discussed above)) (702, see FIG. 1). Then, a Serial Attached Small Computer System Interface (SAS) storage protocol can be layered over Ethernet 150. That is, a SAS storage protocol can be implemented over the interface 150 between the host systems 110 and the storage controllers 130 (704-709) in order to provide commands and transport protocol for exchanging information between the physically separated host computer systems 110 and storage controllers 130.

More specifically, the method embodiments comprise implementing a Serial Attached Small Computer System Interface (SAS) storage protocol over the Ethernet fabric 150 (704). Those skilled in the art will recognize that with conventional SAS storage protocol, the SAS link layer uses a construct known as primitives. Primitives are special 8b/10b encoded characters that are used as frame delimiters, for out of band signaling, control sequencing, etc. These SAS primitives are defined to work in conjunction with the SAS physical layer. However, since the interface 150 has its own physical layer 354 (see FIG. 3), the SAS storage protocol can be implemented without a SAS physical layer. Since there is no longer a need for the a SAS physical layer, the 6 meter distance limitation is overcome (i.e., the host computer systems and storage controllers can be connected to each other but separated by distances up to and greater than 6 meters). However, without a SAS physical layer, an alternate means of conveying the SAS primitives is needed.

Therefore, the process of implementing the SAS storage protocol can comprise encoding SAS primitives (705), assembling SAS headers defined for each of the primitives used (706) and assembling a SAS frame which is delimited by a pair of SAS primitives marking the beginning and the end of the SAS frame (708). Specifically, assembling the SAS headers can comprise specifying in each SAS header the SAS primitive that is encoded as well as the SAS frame size (707). For example, if a SAS primitive is used to delimit a SAS frame, then assembling the SAS header can comprise specifying in the SAS header the primitive used as well as the size of the SAS frame. However, if a primitive is encoded without a SAS frame, then assembling the SAS header can comprise specifying in the SAS header the primitive used and further representing the size of the SAS frame as zero (0). Assembling the SAS frames can comprise defining and assembling the type of SAS frame based on the type of primitive used (709). For example, per the SAS storage protocol, a SAS frame can be assembled as a sequenced packet protocol (SPP) frame, if the primitive comprises a start of frame (SOF). A SAS frame can be assembled as a SAS address frame, if the primitive comprises a start of address frame (SOAF). A SAS frame can be assembled as a Serial Advanced Technology Attachment (SATA) frame, if the primitive comprises a Serial Advanced Technology Attachment_start of frame (SATA_SOF).

Once SAS protocol is implemented, Ethernet frames 400 can be assembled (710, see FIG. 4). The process of assembling each Ethernet frame 400 can comprise assembling Ethernet frames such that each frame comprises an Ethernet header 401 and a body consisting of the SAS Header 402 and the SAS frame 403, if applicable (711, see also FIG. 4). Specifically, each Ethernet frame 400 is assembled such that it encapsulates either a SAS header 402 without a SAS frame or a SAS header 402 followed by a SAS frame 403. Theses Ethernet frames 400 are then sent/received over the interface 150.

Integrity checks can then be performed on an Ethernet frame using the CRC 405 in order to protect the contents of the Ethernet frame (712). Thus, SAS frames 403 contained in (i.e., encapsulated in) Ethernet frames 400 can rely on the data protection afforded by the cyclic redundancy check 405.

The method can also comprise employing congestion management techniques (714). For example, if at process 702 host systems and storage controllers are connected using legacy Ethernet, then the method can further comprise either over-provisioning the network resources (i.e., ensuring that the network has sufficient capacity to support peak demands without suffering data packet drops) or implementing TCP/IP so as to recover from data packet drops (715). Over-provisioning can comprise using conventional over-provisioning techniques (e.g., providing an overabundance of links and switches) to minimize the probability of packet drops as a result of traffic surges. Alternatively, if at process 702 host systems and storage controllers are connected using an enhanced Ethernet for datacenter (EED) fabric, then the method can further comprise using the EED protocols discussed above in order to implement the SAS storage protocol at process 704 without risking data packet drops (716). That is, an enhanced Ethernet for datacenter fabric is improved over legacy Ethernet because it can provide (e.g., via an enhanced media access control (MAC)) both a congestion management function without data packet drops and a priority of service function, when sending and receiving Ethernet frames. Thus, SAS storage protocol can be layered over an Ethernet interface 150 and, particularly, an EED interface without simultaneously implementing TCP/IP or over-provisioning the network.

The embodiments of the invention can take the form of an entirely hardware embodiment, an entirely software embodiment or an embodiment including both hardware and software elements. Furthermore, the embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 8:
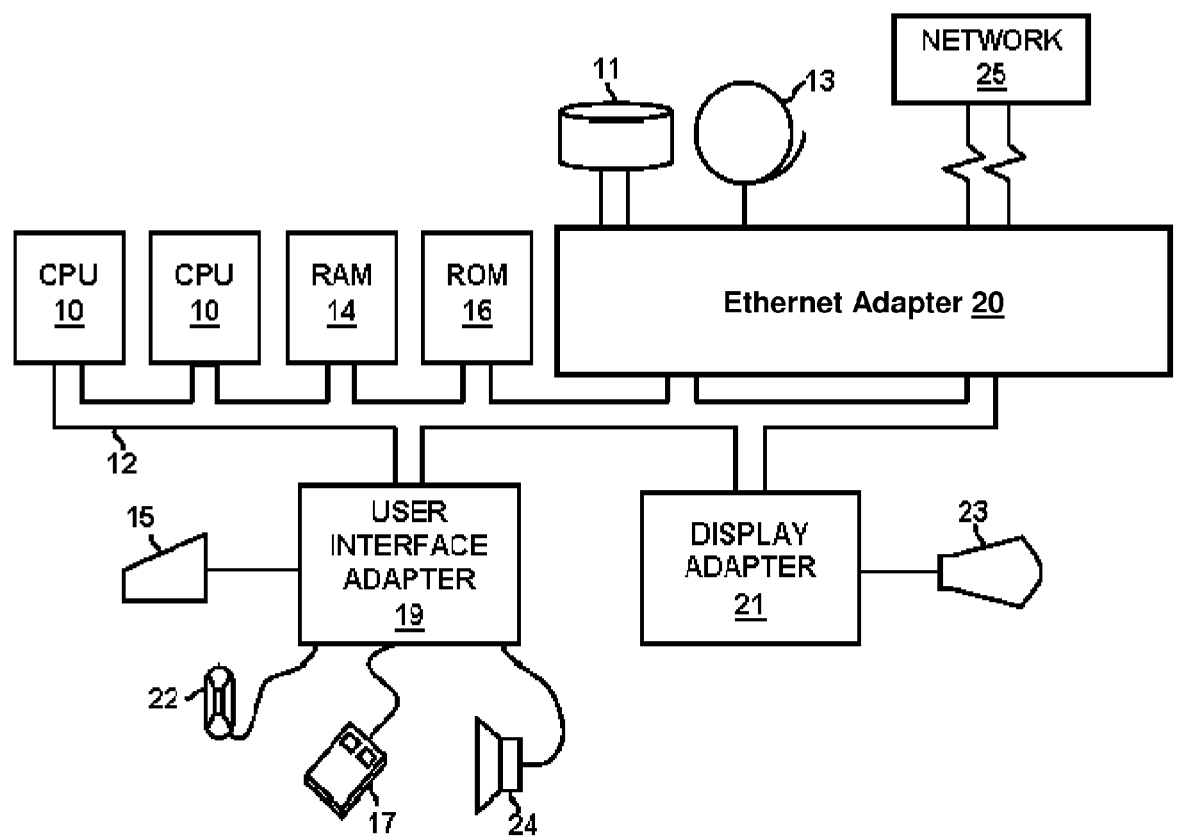
FIG. 8 is a schematic representation of a computer system suitable for use in the embodiments described herein.

A representative hardware environment for practicing the embodiments of the invention is depicted in FIG. 8. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an Ethernet adapter 20, which is adapted to function as both an I/O adapter and a Communications adapter. The Ethernet adapter 20 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, the Ethernet adapter 20 can connect the bus 12 to a data processing network 25, and a display adapter 21 connects the bus 12 to a display device 23 which may be embodied as an output device such as a monitor, printer, or transmitter, for example.

Therefore, disclosed above are embodiments of a storage area network (SAN), a network interface card and a method of managing data transfers. These embodiments overcome the distance limitation of the Serial Attached Small Computer System Interface (SAS) physical layer so that SAS storage protocol may be used for communication between host systems and storage controllers in the SAN. Host systems and storage controls are connected via an Ethernet interface. SAS storage protocol is layered over this Ethernet interface without the TCP/IP layer, providing commands and transport protocol for exchanging information between the host systems and storage controllers. Since the Ethernet interface has its own physical layer, the need for a SAS physical layer is circumvented and, thus, so is the SAS distance limitation. To avoid packet drops due to data traffic congestion in the absence of TCP/IP, the Ethernet network can be over-provisioned or an enhanced Ethernet for datacenter can be used. The number of networks needed in the data center is simplified by using the same Ethernet for both storage as well as communication needs.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments of the invention have been described in terms of preferred embodiments, those skilled in the art will recognize that the embodiments of the invention can be practiced with modification within the spirit and scope of the appended claims.

What is claimed is:

1. A storage area network system comprising:
   multiple host systems, each host system being enabled with a Serial Attached Small Computer System Interface (SAS) storage protocol;
   multiple storage controllers, each storage controller controlling storage of data on multiple corresponding data storage devices and further controlling access to said data, at least one storage controller being physically separated from at least one host system; and
   an Ethernet interface comprising an Ethernet switch connected to said multiple host systems and further connected to each of said multiple storage controllers,
   said Ethernet switch allowing communication between all of said multiple host systems and all of said multiple storage controllers such that said communication is not subjected to a maximum physical distance limitation that is defined by said Serial Attached Small Computer Interface (SAS) storage protocol and that sets a maximum physical distance by which any host system and any storage controller can be physically separated during said communication, and
   said Serial Attached Small Computer System Interface (SAS) storage protocol providing, over said Ethernet interface, commands and transport protocol for exchanging information between said host system and said multiple storage controllers.

2. The storage area network system of claim 1, wherein at least one host system comprises an operating system adapted to implement said Serial Attached Small Computer System Interface (SAS) storage protocol.

3. The storage area network system of claim 1,
   wherein at least one host system further comprises a network interface card comprising an embedded processor adapted to connect said host system to said Ethernet interface, and
   wherein said network interface card comprises an embedded processor adapted to implement said Serial Attached Small Computer System Interface (SAS) storage protocol.

4. The storage area network system of claim 1,
   wherein at least one host system further comprises an operating system and a network interface card comprising an embedded processor,
   wherein, per said Serial Attached Small Computer System Interface (SAS) storage protocol, one of said operating system and said embedded processor is adapted to encode SAS primitives, to assemble SAS headers containing said SAS primitives and further, for any of said SAS primitives that delimit SAS frames, to assemble said SAS frames, and
   wherein said network interface card further comprises an Ethernet media access control adapted to assemble Ethernet frames such that each of said Ethernet frames comprises:
   an Ethernet header;
   a SAS header; and
   if said SAS primitives are used to delimit a SAS frame, said SAS frame.

5. The storage area network system of claim 1,
   said maximum physical distance limitation being no greater than six meters, and
   said at least one controller and said at least one host system being physically separated by a distance greater than six meters.

6. The storage area network system of claim 4,
   wherein if said SAS primitives are used to delimit said SAS frame, said SAS header specifies said SAS primitives and a size of said SAS frame, and
   wherein if said SAS primitives are used without said SAS frame, said size is represented in said SAS header as 0.

7. The storage area network system of claim 4, wherein, per said Serial Attached Small Computer System Interface (SAS) storage protocol, said one of said operating system and said embedded processor is further adapted to assemble each said SAS frame as follows:
   such that said SAS frame comprises a sequenced packet protocol (SPP) frame, if said primitive comprises a start of frame (SOF);
   such that said SAS frame comprises a SAS address frame, if said primitive comprises a start of address frame (SOAF); and
   such that said SAS frame comprises a Serial Advanced Technology Attachment (SATA) frame, if said primitive comprises a Serial Advanced Technology Attachment_start of frame (SATA_SOF).

8. The storage area network system of claim 1,
   wherein said Ethernet interface comprises an enhanced Ethernet for data center interface, and
   wherein said at least one host system further comprises a network interface card comprising an enhanced Ethernet media access control adapted to provide a congestion management without data packet drops function when sending and receiving said Ethernet frames, so that said Serial Attached Small Computer System Interface (SAS) storage protocol can be implemented over said Ethernet interface without transmission control protocol and internet protocol (TCP/IP).

9. A network interface card for a host system, said card comprising:
   a bus interface for connecting to said host system;
   an embedded processor enabled with a Serial Attached Small Computer System Interface (SAS) storage protocol;
   an Ethernet physical layer for connecting to an Ethernet interface, said Ethernet interface comprising an Ethernet switch connected to multiple host systems and further connected to each of multiple storage controllers, at least one storage controller being physically separated from at least one host system,
   said Ethernet switch allowing communication between all of said multiple host systems and all of said multiple storage controllers such that said communication is not subjected to a maximum physical distance limitation that is defined by said Serial Attached Small Computer Interface (SAS) storage protocol and that sets a maximum physical distance by which any host system and any storage controller can be physically separated, during said communication, and each storage controller controlling storage of data on multiple corresponding data storage devices and further controlling access to said data; and said Serial Attached Small Computer System Interface (SAS) storage protocol providing, over said Ethernet interface, commands and transport protocol for exchanging information between said host system and said multiple storage controllers.

10. The network interface card of claim 9, wherein, per said Serial Attached Small Computer System Interface (SAS) storage protocol, said embedded processor is adapted to encode SAS primitives, to assemble SAS headers defined for said SAS primitives and further, for any of said SAS primitives that delimit SAS frames, to assemble said SAS frames.

11. The network interface card of claim 10, further comprising an Ethernet media access control in communication with said embedded processor and adapted to assemble Ethernet frames such that each of said Ethernet frames comprises:

an Ethernet header;
a SAS header; and
if said SAS primitives are used to delimit a SAS frame, said SAS frame,
wherein if said SAS primitives are used to delimit said SAS frame, said SAS header specifies said SAS primitives and a size of said SAS frame, and
wherein if said SAS primitives are used without said SAS frame, said size is represented in said SAS header as 0.

12. The network interface card of claim 9,
said maximum physical distance limitation being no greater than six meters, and
said at least one controller and said at least one host system being physically separated by a distance greater than six meters.

13. The network interface card of claim 11, wherein, per said Serial Attached Small Computer System Interface (SAS) storage protocol, said embedded processor is to further adapted to assemble each said SAS frame as follows:

such that said SAS frame comprises a sequenced packet protocol (SPP) frame, if said primitive comprises a start of frame (SOF);
such that said SAS frame comprises a SAS address frame, if said primitive comprises a start of address frame (SOAF); and
such that said SAS frame comprises a Serial Advanced Technology Attachment (SATA) frame, if said primitive comprises a Serial Advanced Technology Attachment_start of frame (SATA_SOF).

14. The network interface card of claim 11,
wherein said Ethernet interface comprises an enhanced Ethernet for data center interface, and
wherein said Ethernet media access control comprises an enhanced Ethernet media access control adapted to provide a congestion management without data packet drops function when sending and receiving said Ethernet frames, so that said Serial Attached Small Computer System Interface (SAS) storage protocol can be implemented over said Ethernet interface without transmission control protocol and internet protocol (TCP/IP).

15. A method of managing communication between multiple host systems and multiple storage controllers in a storage area network, said method comprising:

enabling each host system with a Serial Attached Small Computer System Interface (SAS) storage protocol; and
connecting said multiple host systems and said multiple storage controllers in said storage area network to an Ethernet interface comprising an Ethernet switch, at least one controller and at least one host system being physically separated and said Ethernet switch allowing communication between all of said multiple host systems and all of said multiple storage controllers such that said communication is not subjected to a maximum physical distance limitation that is defined by said Serial Attached Small Computer Interface (SAS) storage protocol and that sets a maximum physical distance by which any host system and any storage controller can be physically separated during said communication;
said Serial Attached Small Computer System Interface (SAS) storage protocol providing, over said Ethernet interface, commands and transport protocol for exchanging information between said host system and said multiple storage controllers.

16. The method of claim 15, further comprising, with said Serial Attached Small Computer System Interface (SAS) storage protocol,
encoding SAS primitives;
assembling SAS headers defined for said SAS primitives; and
if any of said SAS primitives delimit SAS frames, assembling said SAS frames.

17. The method of claim 16, further comprising assembling Ethernet frames,
wherein said assembling of said Ethernet frames comprises assembling said Ethernet frames such that each of said Ethernet frames comprises:
an Ethernet header;
a SAS header; and
if said SAS primitives are used to delimit a SAS frame, said SAS frame, and
wherein said method further comprises, if said SAS primitives are used to delimit said SAS frame, specifying in said SAS header, said SAS primitive and a size of said SAS frame, and if said SAS primitives are used without said SAS frame, representing said size in said SAS header as 0.

18. The method of claim 15,
said maximum physical distance limitation being no greater than six meters, and
said at least one controller and said at least one host system being physically separated by a distance greater than six meters.

19. The method of claim 17, wherein said assembling of said SAS frame comprises:
assembling said SAS frame as a sequenced packet protocol (SPP) frame, if said primitive comprises a start of frame (SOF);
assembling said SAS frame as a SAS address frame, if said primitive comprises a start of address frame (SOAF); and
assembling said SAS frame as a Serial Advanced Technology Attachment (SATA) frame, if said primitive comprises a Serial Advanced Technology Attachment_start of frame (SATA_SOF).

20. The method of claim 15, further comprising providing congestion management without transmission control protocol and internet protocol (TCP/IP).

* * * * *